United States Patent Office 3,098,049
Patented July 16, 1963

3,098,049
COMPOSITION COMPRISING REACTION PRODUCT OF HYDROLYZED VINYL ACETATE POLYMER AND PERIODATE OXIDIZED POLYSACCHARIDE AND PROCESS FOR PREPARING SAME
Peter J. Borchert, Elkhart, Ind., assignor to Miles Laboratories, Inc., Elkhart, Ind., a corporation of Indiana
No Drawing. Filed Apr. 13, 1960, Ser. No. 21,895
8 Claims. (Cl. 260—17.4)

This invention relates to polymeric compositions derived from polymers of vinyl acetate and dialdehyde polysaccharides. In one of its more particular aspects this invention relates to films formed from the interaction of polymers of vinyl acetate and dialdehyde polysaccharides.

Polyvinyl acetate and its copolymers in the form of aqueous emulsions are used as vehicles for emulsion paints, particularly paints used on stucco and concrete. They also have utility in plaster and dry-wall construction as primer sealers. In addition they find use in the textile industry in the formulation of semi-transparent finishes and as binders for non-woven fabrics and in the paper industry for their greaseproof and waterproof coating characteristics.

It is a well known fact that plastic films formed from aqueous emulsions of polyvinyl acetate and some of its copolymers have a tendency to swell, soften and re-emulsify upon contact with water. Complete destruction of the film takes place within a relatively short period of time depending upon such conditions as film thickness, drying conditions and immersion temperature. For many of the uses to which emulsions of these polymers are put a more effective water, scrub and soap resistance and a shorter film drying time is desirable.

It is accordingly a principal object of this invention to provide polymeric compositions which have the desirable properties of polyvinyl acetate film-formers and in which the undesirable properties of these polymers are not present.

Another object of this invention is to provide compositions which may be used to form films having improved water resistance.

Another object of this invention is to provide films of superior exterior durability.

A further object of this invention is to provide a method for the preparation of compositions having the aforesaid desirable properties.

Other objects and advantages of this invention will become apparent in the course of the following detailed disclosure and description.

It has now been found that compositions having the already desirable properties of polymers of vinyl acetate and improved properties with respect to water resistance and durability may be prepared by the interaction of polymers of vinyl acetate with dialdehyde polysaccharides. The resulting compositions are characterized by forming films which are stable not only upon contact with water but even under more severe solvent treatment.

The vinyl acetate polymers which may be used in the novel compositions of this invention may be homopolymers of vinyl acetate or copolymers prepared by the copolymerization of vinyl acetate with various comonomers copolymerizable therewith. For example, such comonomers as vinyl propionate, vinyl 2-ethylhexoate, vinyl chloride, vinyl maleates, vinyl fumarates, various acrylates and acrylonitriles as well as the higher vinyl esters may be used for this purpose. These polymers and copolymers all will hereinafter be referred to, for the sake of convenience, as polyvinyl acetates.

The polyvinyl acetates are generally used either as stabilized aqueous dispersions, which are commercially available, as externally plasticized polyvinyl acetate emulsions, or as copolymer emulsions in which the comonomer copolymerized with the vinyl acetate is a flexibility imparting monomer which provides permanent flexibility without the use of added plasticizers. There are also available for use polyvinyl acetate powders which may be dispersed in water to form aqueous emulsions.

It will be understood in the art that some hydrolysis both of the vinyl acetate or other ester monomers and of the polyvinyl acetates occurs during polymerization. The degree of hydrolysis of polyvinyl acetate in standard finished emulsions is usually in the range of about 0.1% to 2%. The use of such partially hydrolyzed polyvinyl acetates and those wherein hydrolysis is accomplished after polymerization, wherein the hydroxyl content, expressed as percent of polyvinyl alcohol, is from about 2% to 80%, is included within the concept of this invention. In fact, it is believed that the excellent water resistance or water insensitivity of the compositions of this invention is due in part to the utilization of the hydroxyl groups resulting from partial hydrolysis of the polyvinyl acetates. Cross-linkages are formed between chains of the vinyl alcohol fractions of the polyvinyl acetates and the dialdehyde polysaccharides.

The dialdehyde polysaccharides which interact with the polyvinyl acetates to form the novel compositions of this invention are those obtained by the oxidation of polymeric polysaccharides such as by the action of periodic acid. This well known reaction may be exemplified by the oxidation of starches with periodic acid in accordance with the equation shown below:

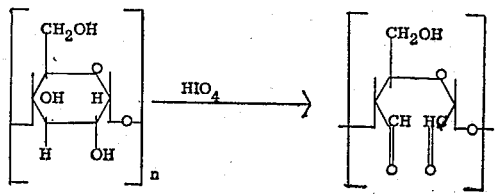

It may be seen that the resulting product of this oxidation, known in the art is dialdehyde starch, is a polymer which contains two aldehyde groups per glycoside unit of the starch molecule resulting from oxidation of the corresponding 1,2-glycol. Other polysaccharides than starches may be utilized in the preparation of the polymeric dialdehydes, for example, celluloses, dextrins, dextrans and the like. It will be appreciated that dialdehyde starch and other dialdehyde polysaccharides may exist with varying degrees of oxidation depending upon the conditions under which the oxidation reaction is carried out. For the purpose of this invention, in order to prepare films having the greatest degree of water insensitivity, it is preferred that a highly oxidized dialdehyde starch be used, for example, one comprising a starch which has been about 90% oxidized. By a 90% oxidized starch is meant one in which 90 out of every 100 glycoside units have been converted to the dialdehyde. Other levels of oxidation may, of course, be utilized if desired.

Dialdehyde starch may be advantageously prepared for use in the form of an aqueous dispersion by heating a slurry of the dialdehyde starch until a homogeneous dispersion of dialdehyde starch is obtained. Heating with a 0.1 N to 1.0 N solution of a buffer salt such as sodium acetate, sodium bicarbonate, disodium phosphate or the like, at a temperature of 40° C. to 50° C. aids the stability of the dialdehyde starch and is especially effective for this purpose. Dialdehyde starch dispersions may be prepared in any desired concentration. For most purposes, however, a concentration of from about 5% to about 25% is preferred. Dispersions of other dialdehyde polysaccharides may be similarly prepared. Such dispersions may then be utilized for preparing the novel compositions of this invention without further treatment. If the polyvinyl acetate is to be used as a dispersible powder then the dialdehyde polysaccharide may also be used in this form.

In the practice of the present invention the dialdehyde starch or other dialdehyde polysaccharide may be used in an amount of from about 0.05% to about 2% based on the weight of the polyvinyl acetate and preferably in the range of from about 0.5% to about 1%.

The preparation of these novel polymeric compositions having improved water resistance is physically accomplished by mixing an emulsion of the polyvinyl acetate with a dispersion of the dialdehyde polysaccharide. The dispersion may be prepared for use as described above. If desired, the dialdehyde polysaccharide may be added to the polyvinyl acetate at a higher temperature than room temperature, but elevated temperatures are not essential for this purpose. In fact, room temperature is preferred since less degradation of the polymers occurs at room temperature than at elevated temperatures.

It is generally unnecessary to adjust the hydrogen ion concentration of the polyvinyl acetate emulsion prior to addition of the dialdehyde polysaccharide. These emulsions have their optimum latex stability and are supplied at about pH 4 to pH 6. Since this acidic medium favors the cross-linking reaction between the polyvinyl acetate and the dialdehyde polysaccharide no additional acid need be used to catalyze the reaction.

It has generally been found desirable to incorporate with the polyvinyl acetate and the dialdehyde starch a protective colloid such as is used in emulsions to prevent agglomeration of the polymer particles as they are formed, and to maintain the finished polymer in a stable latex form. Since a protective colloid also increases the viscosity of the aqueous phase and thereby reduces the sedimentation rate of the solid particles it is also known to produce a stabilizing effect on the emulsion. Exemplary of protective colloids frequently used are sodium carboxymethyl cellulose, hydroxy ethyl cellulose, the sodium or ammonium polyacrylates, polyvinyl alcohol, alginates and starches, all of which are commercially available for this purpose.

As pointed out above, the formation of the novel polymeric compositions of this invention and the improved water resistance thereof has been shown to be due to a cross-linking reaction between the chains of polyvinyl acetates on the one hand and dialdehyde polysaccharides on the other. The exact mechanism of the cross-linking reaction is not known but it is likely that interaction between the two types of polymers results in the formation of acetal type cross-linkages. This acetal formation gives rise to a relatively stable polymeric composition which may be characterized as having the following structure:

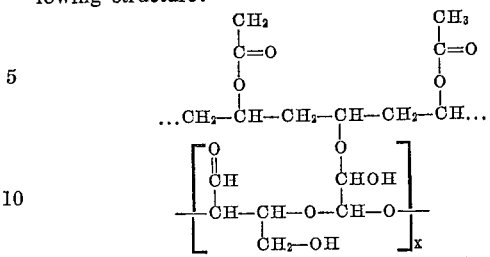

It has been found that the dialdehyde polysaccharide is not absorbed within the particles of the polyvinyl acetate. Instead, it is seen to remain on the surface of the polymer particles together with the protective colloid. This surface treatment of the polymer particles is apparently responsible for the observed water resistance of the resulting polymeric compositions.

The invention will be better understood by reference to the following examples which are included for purposes of illustration and are not to be construed as in any way limiting the scope of the instant invention.

EXAMPLE 1

A 25% solid-containing dispersion of dialdehyde starch was prepared by adding 50 g. of 90% oxidized dialdehyde starch (10% moisture content) in 10 g. portions to 135 ml. samples of tap water containing, dissolved therein, 5 g. of sodium acetate. The additions were made gradually over a period of about 10 minutes each and the resulting mixture was heated with stirring at 50° C. until a homogeneous dispersion of dialdehyde starch was obtained.

The dialdehyde starch dispersion was diluted to form a 10% aqueous dispersion, and this dispersion mixed with commercially available polyvinyl acetate emulsion containing 55% solids. Films were formed from the resulting emulsion by applying with a roller to glass plates and drying by evaporation of water at room temperature (25° C.) for 18 to 20 hours. In some cases an additional amount of a protective colloid (methyl cellulose) or an external plasticizer (acetyl triethylcitrate) was also included. The films were then stripped off the glass plates and their thickness was measured. Strips having dimensions of 4 mm. by 15 mm. were cut from each sample and immersed in water at room temperature for one hour. The increase in area of the strip after immersion in water was calculated. In addition, the stability of the films in various solvents at room temperature was observed. In all cases the films took up water within 30 to 60 minutes but remained intact and were not sticky or tacky in cases where dialdehyde starch was added. The results are summarized in Table I.

Table I

| Expt. No. | Polyvinyl acetate (parts by weight dry basis) | Dialdehyde starch (parts by weight dry basis) | Protective colloid (parts by weight dry basis) [1] | Plasticizer (parts by weight) | Film drying time at 25° C. (hours) | Film thickness (mils) | Area of film after immersion in water (percent— original area = 100%) | Stability of film in various solvents [2] | | |
|---|---|---|---|---|---|---|---|---|---|---|
| | | | | | | | | 10% sodium chloride | Non-ionic surfactant [3] | 1 N hydrochloric acid |
| 1 | 27.5 | | 0.2 | | 18 | 8-10 | (4) | − | − | − |
| 2 | 55 | | | | 20 | 20-25 | (4) | − | − | − |
| 3 | 55 | .55 | | | 20 | 20-25 | 106 | + | + | + |
| 4 | 55 | .55 | | ⁵3 | 18 | 20-25 | 106 | + | + | ± |
| 5 | 27.5 | 1.38 | 0.2 | | 18 | 8-10 | 106 | + | + | ± |
| 6 | 27.5 | 2.75 | 0.2 | | 18 | 8-10 | 106 | + | − | ± |
| 7 | 55 | 0.28 | | ⁵3 | 18 | 20-25 | 106 | + | − | − |

[1] Added as 2% aqueous dispersion of methyl cellulose (Methocel 60 HG, Dow Chemical Co.).
[2] Strips were immersed in solutions as indicated and the qualities of the films evaluated as follows: + film intact, not tacky; ± film intact, tacky; − film re-emulsifies.
[3] 1% Tergitol NPX, Union Carbide Corp.
[4] Film re-emulsifies within 1 hour.
[5] Acetyl triethylcitrate.

The following example illustrates the use of a partially hydrolyzed polyvinyl acetate in preparing the water resistant composition of this invention.

EXAMPLE 2

The procedure of Example 1 was followed except that an emulsion of a partially hydrolyzed polyvinyl acetate with a residual of 19.5–21.5% of polyvinyl acetate was combined with varying amounts of a dispersion of dialdehyde starch. The results are given in Table 2.

Table 2

| Expt. No. | Partially hydrolyzed polyvinyl acetate (parts by weight dry basis) [1] | Dialdehyde starch (parts by weight dry basis) [2] | Film drying time at 25° C. (hours) | Film thickness (mils) | Area of film after immersion in water (percent— original area = 100%) | Stability of film in various solvents | | |
|---|---|---|---|---|---|---|---|---|
| | | | | | | 10% sodium Chloride | Non-ionic Surfactant | 1 N hydrochloric acid |
| 8 | 20 | | 18 | 5–7 | ([3]) | − | − | − |
| 9 | 20 | 0.1 | 18 | 5–7 | 143 | + | + | + |
| 10 | 20 | 0.2 | 18 | 5–7 | 138 | + | + | + |
| 11 | 20 | 0.4 | 18 | 5–7 | 137 | + | + | + |

[1] Added as 10% by weight aqueous dispersion.
[2] Added as 25% by weight aqueous dispersion, prepared as described in Example 1.
[3] >200, film is slimy and falls apart.

These results indicate that a more highly hydrolyzed polyvinyl acetate produces a film which, when mixed with dialdehyde starch displays a greater area increase than in the case of the less highly hydrolyzed sample. It is to be noted that an area increase of about 200 is considered satisfactory for many applications.

The following example is included to illustrate the use of a polyvinyl acetate powder in forming the improved compositions of this invention.

EXAMPLE 3

A 10% dispersion of dialdehyde starch was prepared by adding 20 g. of 90% oxidized dialdehyde starch (10% moisture) with stirring to 162 ml. of tap water and heating the mixture at 70° C. for 20 minutes until a homogeneous dispersion was formed. A commercially available polyvinyl acetate powder was dispersed in water at 40° C. to give a resin solids content of 50% and the resulting dispersion was mixed with different amounts of the 10% dialdehyde starch dispersion. The resulting polymeric compositions were applied with a roller to glass plates and evaluated as described in Example 1. The results are shown in Table 3.

Table 3

| Expt. No. | Polyvinyl acetate powder (parts by weight dry basis) [1] | Dialdehyde starch (parts by weight dry basis) [2] | Film drying time at 25° C. (hours) | Film thickness (mils) | Area of film after immersion in water (percent— original area = 100%) | Stability of film in various solvents | | |
|---|---|---|---|---|---|---|---|---|
| | | | | | | 10% Sodium chloride | Non-ionic surfactant | 1 N hydrochloric acid |
| 12 | 50 | | 18 | 20–25 | Falls apart | − | − | − |
| 13 | 50 | 0.5 | 18 | 20–25 | 114 | + | + | + |
| 14 | 50 | 1.0 | 18 | 20–25 | 112 | + | + | + |

[1] Added as a 50% by weight aqueous dispersion.
[2] Added as a 10% by weight aqueous dispersion.

These results indicate that the improved compositions of this invention can be prepared by the use of commercially available polyvinyl acetate powders and that the compositions resulting from a mixture of emulsions prepared from these powders with dispersions of dialdehyde starch have greatly enhanced water stability.

It can thus be seen that the use of dialdehyde starch with polyvinyl acetate results in films which do not re-emulsify upon immersion in water and which are substantially unaffected by treatment with various solvents. On the other hand, films formed from polyvinyl acetates alone are seen to re-emulsify in water within a very short period of time and usually within one hour. The novel compositions of this invention, then, have been shown to have inhanced water resistance and improved stability and films formed from these compositions have been shown to be considerably more durable than films formed from polyvinyl acetate itself.

In summary, this invention provides polymeric compositions formed from the interaction of polyvinyl acetates and dialdehyde polysaccharides. These compositions are capable of forming films of greatly improved water resistance and durability.

Other embodiments than those specifically described may, of course, be used in the practice of this invention and are intended to be included within the scope thereof, which is defined in the appended claims.

What is claimed is:

1. A composition comprising the reaction product of (a) a partially hydrolyzed polymer of vinyl acetate having a hydroxyl content expressed as percent of polyvinyl alcohol of about from 2% to 80% selected from the group consisting of homopolymers of vinyl acetate and copolymers of vinyl acetate with ethylenically unsaturated monomers with (b) a periodate oxidized polysaccharide, wherein said periodate oxidized polysaccharide is present in an amount of about between 0.05% to 2% based on the weight of said polymer of vinyl acetate.

2. A composition according to claim 1 wherein the periodate oxidized polysaccharide is an oxidized polysaccharide in which the level of oxidation is about at least 90%.

3. A composition according to claim 1 wherein the periodate oxidized polysaccharide is periodate oxidized starch.

4. A composition according to claim 1 wherein the periodate oxidized polysaccharide is present in an amount of about between 0.5% to 1% based on the weight of said polymer of vinyl acetate.

5. A film formed upon the drying of an aqueous emulsion of the composition of claim 1.

6. A process for the preparation of a water insensitive polymeric composition which comprises reacting (a) an aqueous emulsion of a partially hydrolyzed polymer of vinyl acetate having a hydroxyl content expressed as percent of polyvinyl alcohol of about from 2% to 80% selected from the group consisting of homopolymers of vinyl acetate and copolymers of vinyl acetate with ethylenically unsaturated monomers with (b) an aqueous dispersion of a periodate oxidized polysaccharide, in a proportion of about between 0.05% to 2% of periodate oxidized polysaccharide based on the weight of said polymer of vinyl acetate at a hydrogen ion concentration of about from pH 4 to pH 6.

7. A process according to claim 6 wherein the dispersion of the periodate oxidized polysaccharide is prepared by heating a slurry composed of said periodate oxidized polysaccharide and about a 0.1 N to 1.0 N solution of a buffer salt at a temperature of about from 40° C. to 50° C.

8. A process according to claim 6 wherein the periodate oxidized polysaccharide is periodate oxidized starch.

References Cited in the file of this patent
UNITED STATES PATENTS

| | | |
|---|---|---|
| 2,809,945 | Wright et al. | Oct. 15, 1957 |
| 2,956,962 | Wise et al. | Oct. 18, 1960 |

OTHER REFERENCES

Kerr: "The Chemistry and Industry of Starch," 2nd edition, published by Academic Press Inc., 1950, pages 328–336.